(12) United States Patent
Horisaki

(10) Patent No.: US 8,023,221 B1
(45) Date of Patent: Sep. 20, 2011

(54) POSITION GAIN CALIBRATION IN DISK DRIVES

(75) Inventor: Makoto Horisaki, Fujisawa (JP)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/271,382

(22) Filed: Nov. 14, 2008

Related U.S. Application Data

(60) Provisional application No. 60/988,285, filed on Nov. 15, 2007, provisional application No. 61/104,479, filed on Oct. 10, 2008.

(51) Int. Cl.
*G11B 5/596* (2006.01)

(52) U.S. Cl. ...................................... 360/77.08

(58) Field of Classification Search .................. None
See application file for complete search history.

(56) References Cited

U.S. PATENT DOCUMENTS

| | | | | |
|---|---|---|---|---|
| 5,170,299 A * | 12/1992 | Moon | ......................... | 360/77.08 |
| 5,362,993 A * | 11/1994 | Aubry | ............................. | 327/94 |
| 5,453,887 A * | 9/1995 | Negishi et al. | ............. | 360/77.01 |
| 5,600,506 A * | 2/1997 | Baum et al. | ................. | 360/78.14 |
| 5,828,516 A * | 10/1998 | Park | ........................... | 360/78.14 |
| 5,867,341 A * | 2/1999 | Volz et al. | ................... | 360/77.08 |
| 5,966,264 A * | 10/1999 | Belser et al. | ............... | 360/77.08 |
| 6,226,142 B1 * | 5/2001 | Drouin et al. | .............. | 360/77.08 |
| 6,369,974 B1 * | 4/2002 | Asgari et al. | ............... | 360/78.14 |
| 6,760,185 B1 * | 7/2004 | Roth et al. | .................. | 360/77.08 |
| 7,027,254 B2 * | 4/2006 | Takaishi | ..................... | 360/77.04 |
| 7,123,433 B1 * | 10/2006 | Melrose et al. | ............ | 360/77.04 |
| 7,453,663 B1 * | 11/2008 | Benakli et al. | ............. | 360/77.08 |
| 2008/0239556 A1 | 10/2008 | Wiseman et al. | | |

* cited by examiner

*Primary Examiner* — K. Wong

(57) ABSTRACT

A system including a signal generating module and a position control module. The signal generating module generates position error signals based on servo bursts read from a servo region of a track of a disk drive. The servo bursts are read by a head of the disk drive and include first, second, third, and fourth servo bursts. The position control module generates differences between the position error signals and determines a position of the head relative to the track based on (i) a first difference of the differences and (ii) a second difference of the differences. The first difference is based on the first servo burst and the second servo burst. The second difference is based on (i) the third servo burst and (ii) the first servo burst or the second servo burst and is independent of the fourth servo burst.

20 Claims, 20 Drawing Sheets

POSITION GAIN CALIBRATION IN DISK DRIVES

CROSS-REFERENCE TO RELATED APPLICATIONS

This application claims the benefit of U.S. Provisional Application No. 60/988,285, filed on Nov. 15, 2007 and U.S. Provisional Application No. 61/104,479, filed on Oct. 10, 2008. The disclosures of the above applications are incorporated herein by reference in their entirety.

FIELD

The present disclosure relates to rotating data storage devices, and more particularly to systems and methods for controlling positioning of read/write heads in rotating data storage devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a hard disk drive (HDD) 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write (R/W) channel (hereinafter, "read-channel") module 28.

The HDD PCB 14 includes the read-channel module 28, a hard disk controller (HDC) module 30, a processor 32, a spindle/VCM driver module 34, volatile memory 36, nonvolatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26. During read operations, the read-channel module 28 receives analog signals from the preamplifier device 26. The read-channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads 20 over the platters 16 during read/write operations. Servo, which is stored on the platters 16, ensures that data is written to and read from correct locations on the platters 16. In some implementations, a self-servo write (SSW) module 42 may write servo on the platters 16 using the heads 20 prior to storing data on the HDD 10.

SUMMARY

A system comprises a signal generating module and a position control module. The signal generating module generates position error signals (PESs) based on servo bursts read by a head from a servo region of a track. The position control module generates differences between the PESs and determines a position of the head relative to the track based on first and second ones of the differences. The first one of the differences is based on first and second ones of the servo bursts. The second one of the differences is based on a third one of the servo bursts and one of the first and second ones of the servo bursts. The third one of the servo bursts is offset by a predetermined distance from the one of the first and second ones of the servo bursts.

The position control module multiplies the first and second ones of the differences by first and second multipliers, respectively. The first multiplier is based on values of the first one of the differences at first and second distances from a center of the track. The second multiplier is based on values of the second one of the differences at third and fourth distances from the center.

A method comprises generating position error signals (PESs) based on servo bursts read by a head from a servo region of a track and generating differences between the PESs. The method further comprises generating a first one of the differences based on first and second ones of the servo bursts. The method further comprises generating a second one of the differences based on a third one of the servo bursts and one of the first and second ones of the servo bursts, where the third one of the servo bursts is offset by a predetermined distance from the one of the first and second ones of the servo bursts. The method further comprises determining a position of the head relative to the track based on the first and second ones of the differences.

The method further comprises generating a first multiplier based on values of the first one of the differences at first and second distances from a center of the track. The method further comprises generating a second multiplier based on values of the second one of the differences at third and fourth distances from a center of the track. The method further comprises multiplying the first and second ones of the differences by the first and second multipliers, respectively.

In still other features, the systems and methods described above are implemented by a computer program executed by one or more processors. The computer program can reside on a non-transitory computer-readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
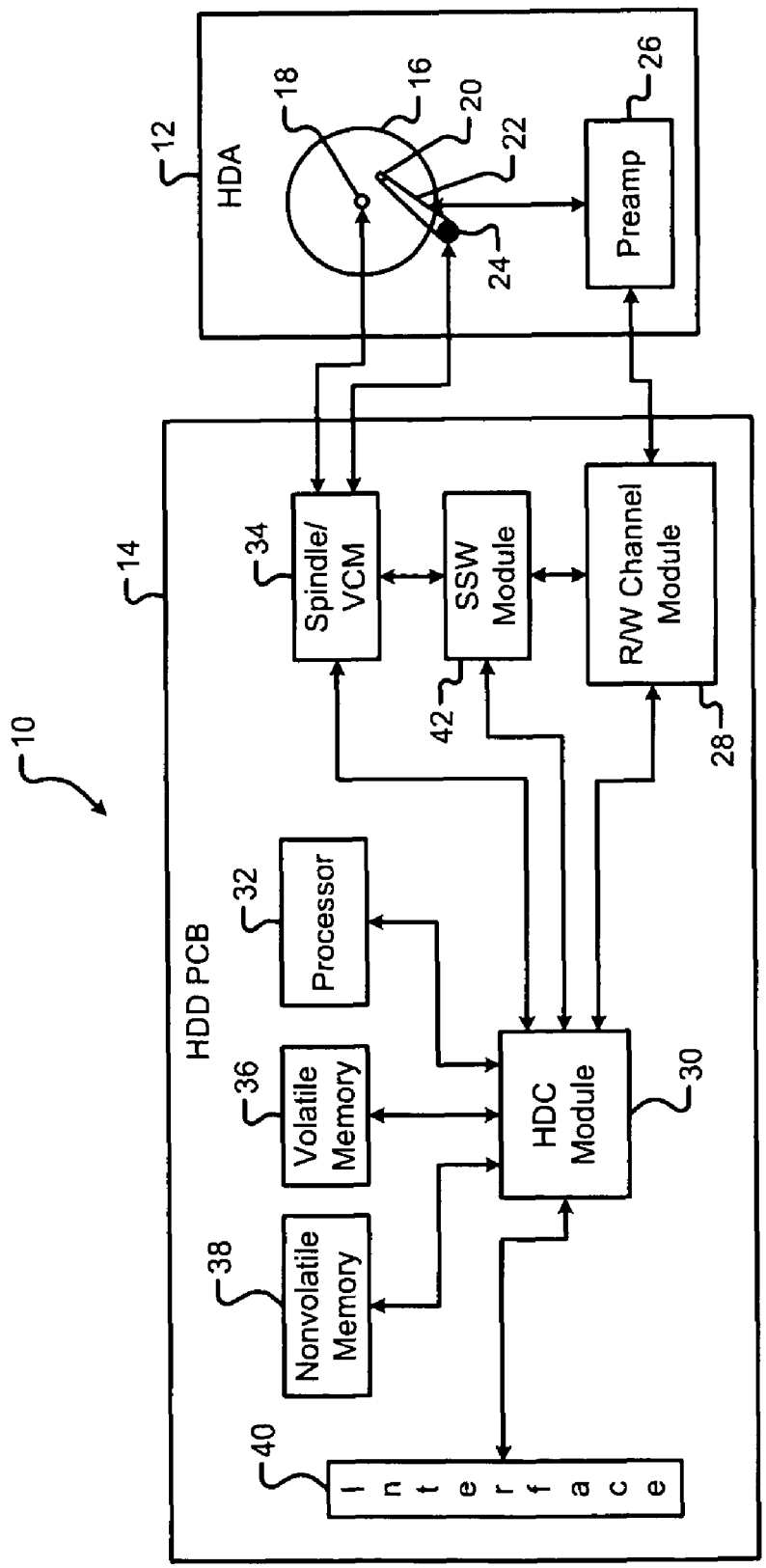
FIG. 1 is a functional block diagram of a hard disk drive (HDD)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

Figure 2:
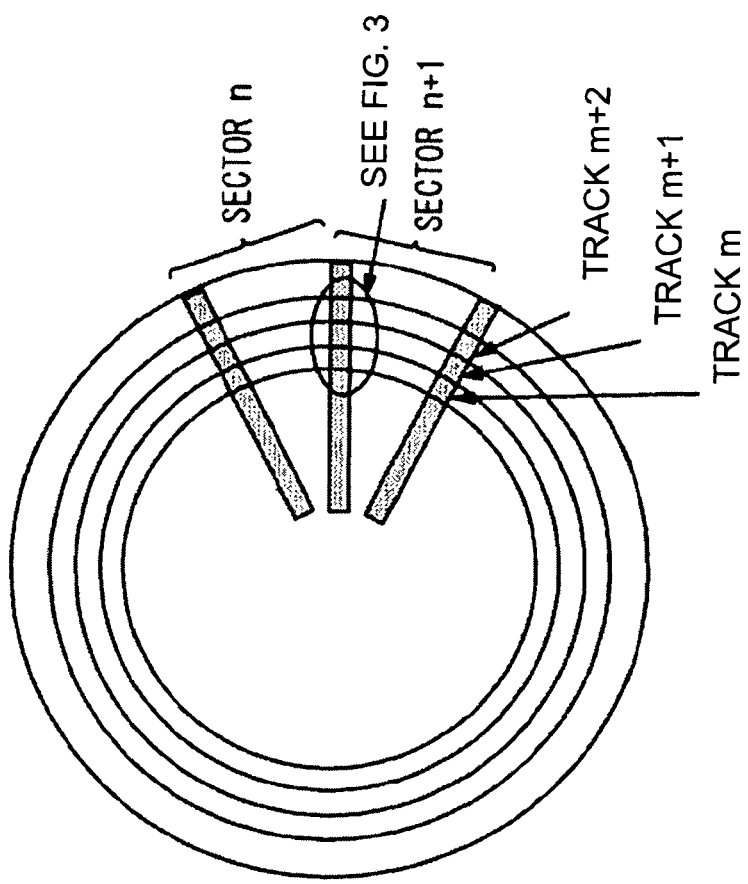
FIG. 2 depicts layout of tracks and servo information on a HDD.
Figure 3:
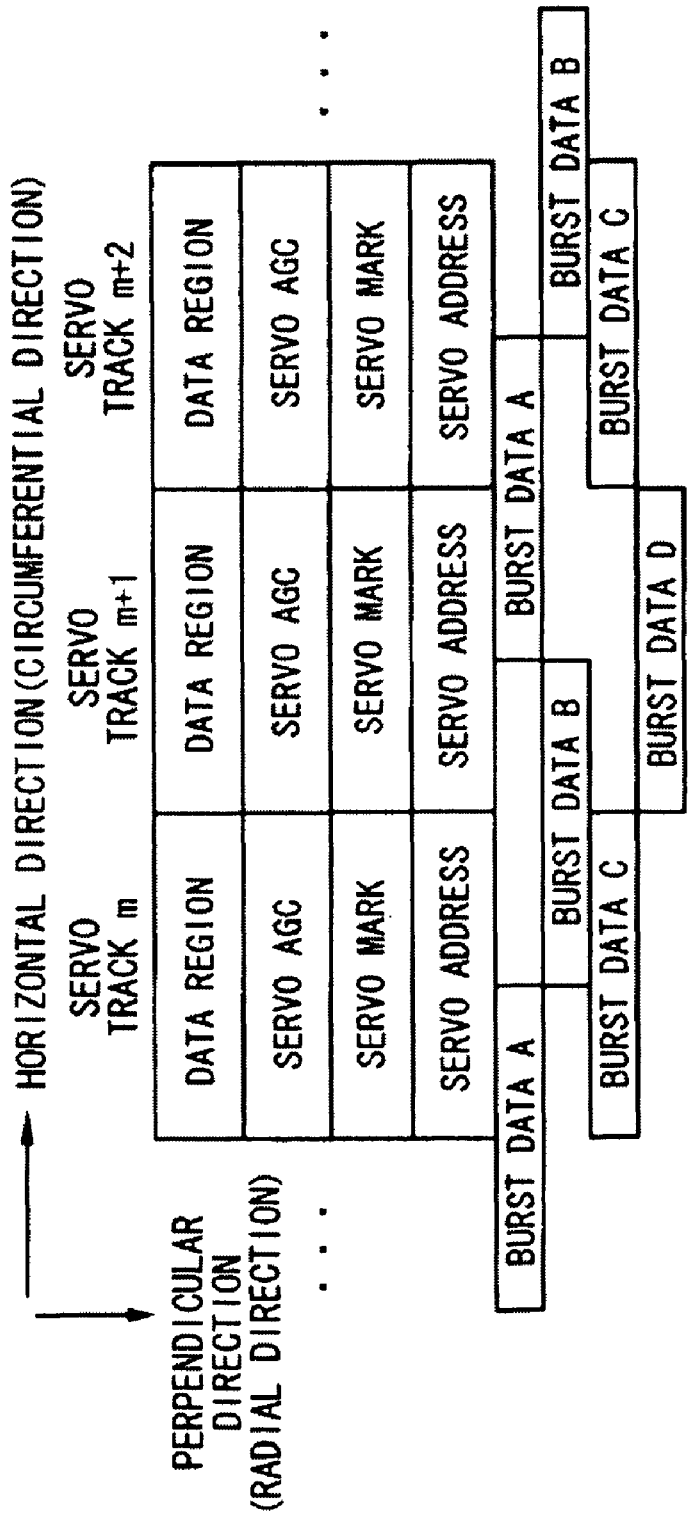
FIG. 3 shows a detailed layout of servo information.

Referring now to FIGS. 2 and 3, data is written on the platters 16 in concentric circles called tracks. In FIG. 2, the tracks are divided into arc-shaped sectors. Servo information used for positioning the heads 20 on the tracks is written in radial, spoke-like servo regions dispersed between the sectors. The servo regions are equally spaced around the circumference of the platters 16. In FIG. 3, the servo information written in each servo region includes a servo automatic gain control (AGC), a servo mark, a servo address, and burst data A, B, C, and D. The burst data A through D may also be called servo bursts A through D, respectively.

A head (e.g., one of the heads 20) detects the burst data when the head moves above the servo region while the platters 16 spin. A position error signal (PES) is generated based on the burst data. The head can be positioned on a track using a pre-stored relationship between the PES and a corresponding track position. A track position is a distance from the center of a track in a perpendicular (i.e., radial) direction. For example, the track position at the center of a track is zero, and the track positions at the edges of a track are −½ and +½. The pre-stored relationships may be stored in the form of a lookup table.

Figure 4:
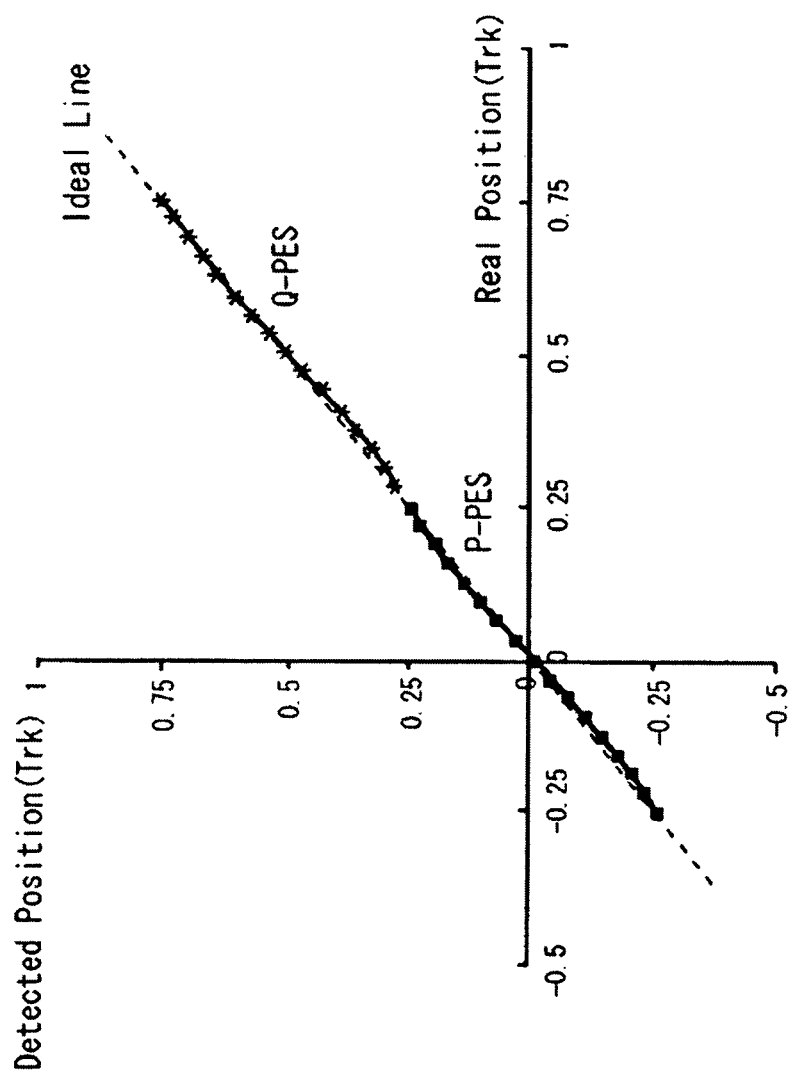
FIG. 4 is a graph of real track positions as a function of detected track positions.

Referring now to FIG. 4, a plurality of PESs can be used to detect a track position that deviates by ±¼ of a track relative to the center of the track. The plurality of PESs can also be used to detect the track position that deviates by ±¼ of a track relative to a boundary between adjacent tracks. Throughout the disclosure, references to the center of the track and the boundary between adjacent tracks are interchangeable.

Typically, to detect the track position, different PESs are selected at ½ track intervals. However, when the PESs are selected at ½ track intervals, the relationship between detected track positions and actual (real) track positions may be non-linear. Consequently, the head position cannot be accurately detected, which in turn causes a drop in the accuracy with which head positioning is controlled.

The non-linearity of the relationship between the PESs and the track positions is usually due to an irregularity in the sensitivity distribution of the head (e.g., a MR head). The non-linearity can be reduced by shortening the interval at which the different PESs are selected. Additionally, the gain of the PESs may be adjusted.

Figure 5:
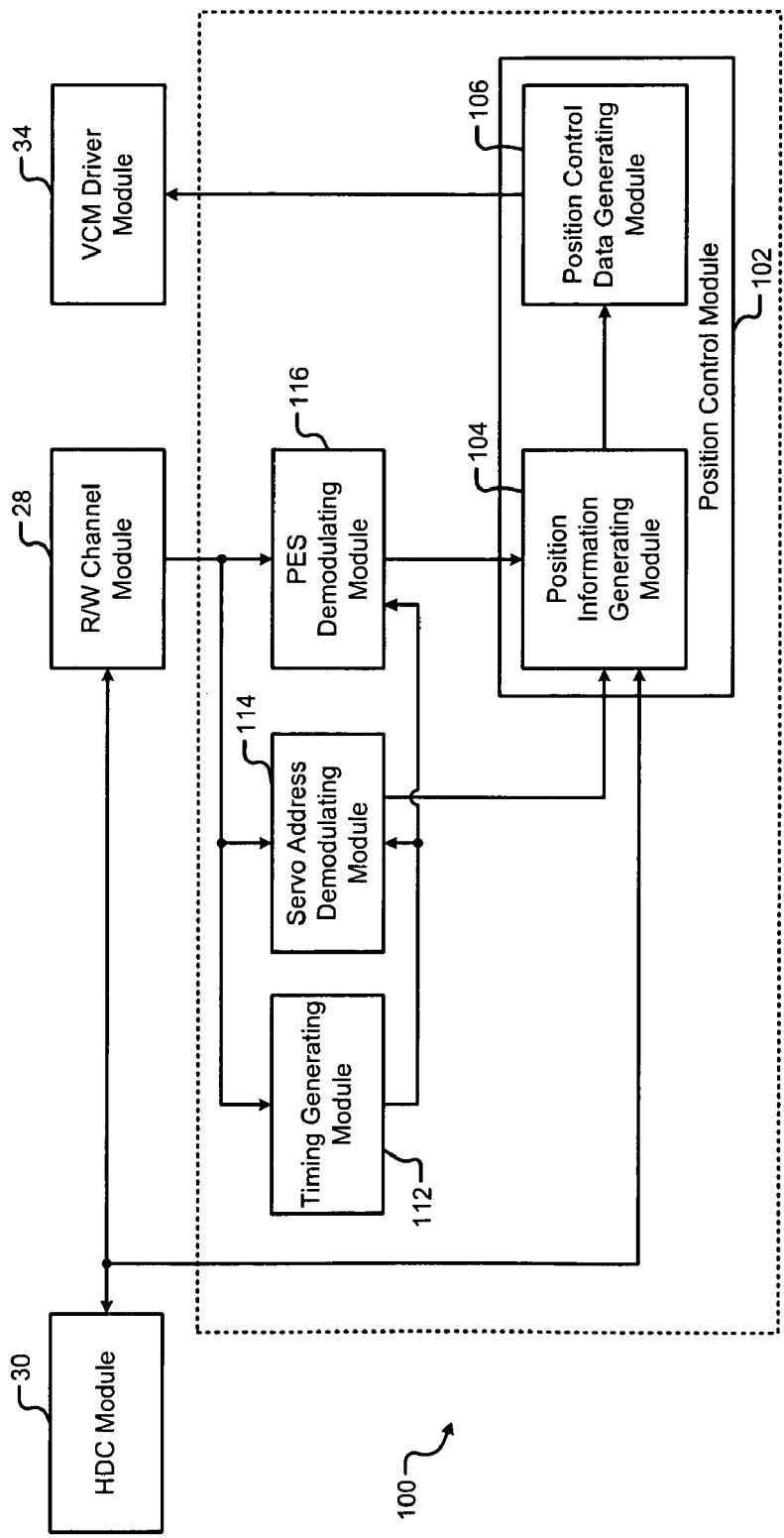
FIG. 5 is a functional block diagram of a system for detecting and controlling track position of a head of a HDD.

Referring now to FIG. 5, a system 100 for selecting the different PESs at track intervals shorter than ½ of a track is shown. The system 100 comprises a position control module 102, a timing generating module 112, a servo address demodulating module 114, and a PES demodulating module 116. The position control module 102 comprises a position information generating module 104 and a position control data generating module 106. The position control module 102 may receive control instructions from the HDC module 30 and/or the self-servo-write (SSW) module 42 (not shown) for controlling read/write operations. The head moves in a radial direction according to control data generated by the position control module 102.

During the read/write operations, the read-channel module 28 receives servo information read by the heads from the platters 16. The read-channel module 28 outputs the servo information to the timing generating module 112, the servo address demodulating module 114, and the PES demodulating module 116. The timing generating module 112 detects the servo mark in the servo information. The timing generating module 112 generates a timing signal to read the servo address and the burst data corresponding to the servo mark.

The servo address demodulating module 114 reads the servo address in the servo information. The servo address demodulating module 114 decodes the servo address and generates a sector number and a track number at which the head is positioned. The servo address demodulating module 114 outputs the sector number and the track number to the position information generating module 104.

The PES demodulating module 116 generates the PESs from the burst data A, B, C, and D in the servo information. The PES demodulating module 116 outputs the PESs to the position information generating module 104. The position information generating module 104 references the pre-stored position information corresponding to the PESs. Thus, the position information generating module 104 generates the position control data for the head corresponding to the PESs.

To move the head to a desired position, the position control module 102 forms a feedback loop. The feedback loop receives the present position of the head generated using the position information generating module 104. The feedback loop generates the distance to move the head based on a difference between the present position and the position determined by the position control data generating module 106. The feedback loop sends the position control data to the VCM driver module 34. Thus, the position control module 102 controls the position of the head based on the PES value and the position information. In some implementations, the position information generating module 104 may generate and store the position information during manufacturing.

Figure 6:
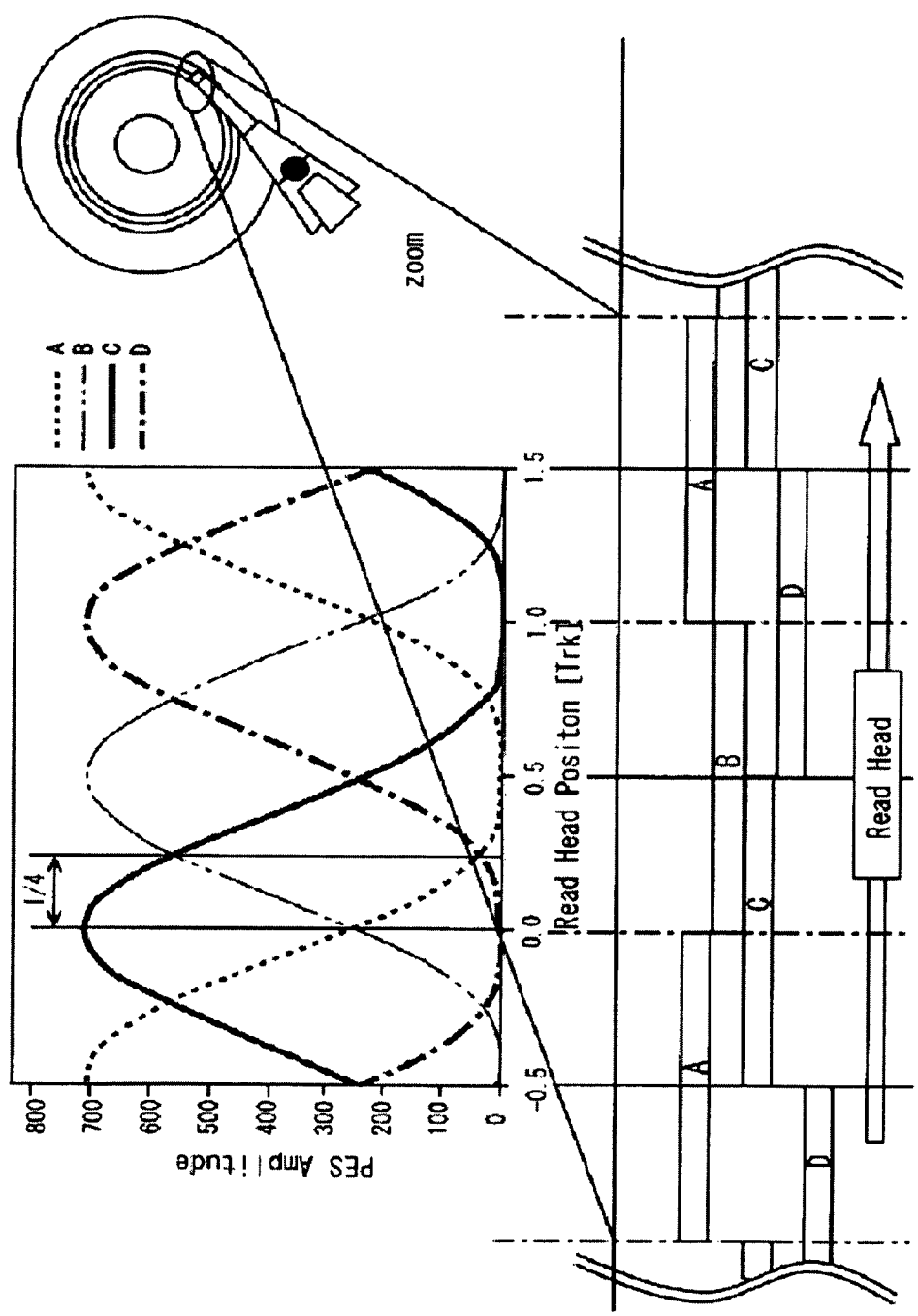
FIG. 6 depicts position error signals (PESs) generated from reading the servo information.

Referring now to FIG. 6, a graph shows a relationship between positions of the head in the servo regions and PES values detected by the head in the corresponding positions. The horizontal axis represents the position of the head in a direction perpendicular to the tracks (i.e., the radial direction). The values 0.0, 1.0, . . . , etc. on the horizontal axis represent head position relative to the center of each track. The vertical axis represents the value of the signal output by the head for each of the burst data A, B, C, and D.

Below the graph, a plurality of burst patterns is shown. The burst patterns are written in a direction perpendicular to the tracks. Each burst pattern includes burst data having a burst repetition rate equal to the width of a track. For example, the first burst pattern includes burst data A with a burst repetition rate equal to the width of a track. The second to fourth burst patterns include burst data B, C, and D, respectively, each having burst repetition rates equal to the width of a track. The value of the signal output by the head is determined by the size of the region in which the head and the burst data overlap. Accordingly, the signal output by the head has a wavelength of twice the width of a track.

Each burst pattern may be arranged such that the position of the burst data in one burst pattern is different from the position of the burst data in another burst pattern. For example, each burst data in one burst pattern may be shifted by an amount substantially equal to half the width of the track relative to the burst data in another burst pattern. Alternatively, each burst data in one burst pattern may be shifted by an amount substantially equal to the width of the track relative to the burst data in another burst pattern.

As shown, the burst data A is shifted relative to the burst data B by an amount substantially equal to half the width of the track in the radial direction. More specifically, the burst data A is arranged such that the ends of the burst data A are positioned in the radial direction at the centers of the $(2m-1)^{th}$ track and the $(2m)^{th}$ track, respectively, where m is an integer greater than or equal to 1. The burst data B is arranged such that the ends of the burst data B are positioned in the radial direction at the centers of the $(2m)^{th}$ track and the $(2m+1)^{th}$ track, respectively.

The burst data A is shifted relative to the burst data C and relative to the burst data D by an amount substantially equal to half the width of the track in the radial direction. The burst data B is shifted relative to the burst data C and relative to the burst data D by an amount substantially equal to half the width of the track in the radial direction.

More specifically, the burst data C is arranged such that the center of the burst data C in the radial direction is the center of the $(2m)^{th}$ track. The burst data D is arranged such that the center of the burst data D in the radial direction is the center of the $(2m-1)^{th}$ track. The length of each burst data in the radial direction is equal to the width of a track. By arranging the burst data in this manner, the position of the head can be detected based on the values of the signals output by the head when the head reads the burst data A through D.

For example, if the center of the head is at the 0 position relative to the position of the center of the track m, the center of the head is at the boundary between the burst data A and the burst data B. Accordingly, the width of the burst data A read by the head when the head passes horizontally (i.e., in the circumferential direction) over the burst data A is equal to the width of the burst data B read by the head when the head passes horizontally over the burst data B. Thus, the value (i.e., amplitude) of the signal output by the head when passing over the burst data A (i.e., PESa) is equal to the value of the signal output by the head when passing over the burst data B (i.e., PESb). Thus, if PESab is defined as (PESa−PESb), PESab=(PESa−PESb)=0 when the output values of the signals generates by reading the burst data A and the burst data B are the same. Accordingly, when PESab=0, the position control module 102 determines that the head is positioned directly above the center of the track.

On the other hand, if the center of the head is at the 0.5 position relative to the position of the boundary between tracks, the center of the head is at the boundary between the burst data C and the burst data D. Accordingly, the width of the burst data C read by the head when the head passes horizontally over the burst data C is equal to the width of the burst data D read by the head when the head passes horizontally over the burst data D. Thus, the value (i.e., amplitude) of the signal output by the head when passing over the burst data C (i.e., PESc) is equal to the value of the signal output by the head when passing over the burst data D (i.e., PESd). Thus, if PEScd is defined as (PESc−PESd), PEScd=(PESc−PESd)=0 when the output values of the signals generates by reading the burst data C and the burst data D are the same. Accordingly, when PEScd=0, the position control module 102 determines that the head is positioned directly above the boundary between two adjacent tracks.

Figure 7:
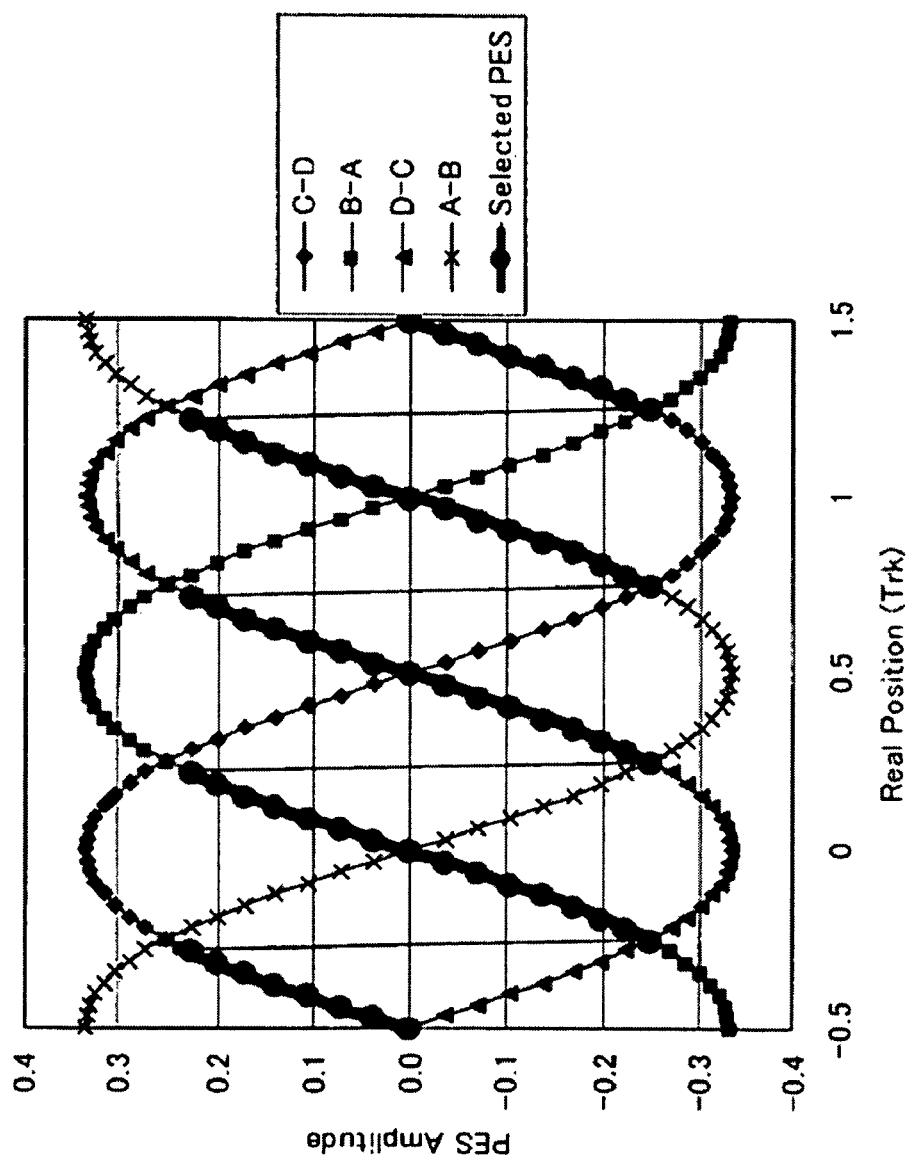
FIG. 7 is a graph of real track positions as a function of PES amplitude.

Referring now to FIG. 7, output values of PESab, PEScd, PESba, and PESdc relative to distances from the track m are shown. The 0 position on the horizontal axis corresponds to the center of the track m. At the center of the track m, PESab=PESba=0. PESba increases when the head moves in a positive direction from the track m and decreases when the head moves in a negative direction from the track m. PEScd is maximum at the center of the rack m. PESba is maximum at a position shifted by +½ of a track from the center of the track m, which is the position of the boundary between track m and track m+1. PEScd=PESba at a position shifted by +¼ of a track from the center of the track m.

One of PESab, PEScd, PESba, and PESdc is more linear than the others in a segmented region of a track, where the segmented region may include a region ranging from +¼ to −¼ of a track from the position at the center of a track (i.e., the track position 0). Alternatively, the segmented region may include a region ranging from +¼ to −¼ of a track from the position at the boundary between tracks (i.e., the track position 0.5). The most linear PES in each segmented region is used to accurately detect the track position.

For example, the position information generating module 104 selects the value of PESba in the segmented region ranging from +¼ to −¼ of a track from the center of the track m. The position information generating module 104 associates the selected PESba with the track position. The position information generating module 104 selects the PESdc in the next segmented region having a width equal to ½ of a track. The position information generating module 104 further selects PESab in the following segmented region having a width equal to ½ of a track.

Generally, the position information generating module 104 may select the PESs for the segmented regions as shown below.
−¾ to −¼: PEScd
−¼ to +¼: PESba
+¼ to +¾: PESdc
+¾ to +⁵⁄₄: PESab
⁵⁄₄ to +⁷⁄₄: PEScd When the head is at a distance of +¼ or −¼ of a track from the center of the track m (or from the boundary between adjacent tracks), a plurality of PES values match each other as shown in FIG. 7. Accordingly, when a plurality of PES values are equal, the position information generating module 104 determines that the position of the head is at a distance of +¼ or −¼ of a track from the center of the track m (or from the boundary between adjacent tracks).

More specifically, the position of the head is at a distance of +¼ or −¼ of a track from the center of the track m (or from the boundary between adjacent tracks) when the PES values shown below are equal to each other.
PESab=PEScd: position is −¼ of a track from the center of the track m.
PEScd=PESba: position is +¼ of a track from the center of the track m.
PESba=PESdc: position is +¾ of a track from the center of the track m.
PESdc=PESab: position is +⁵⁄₄ of a track from the center of the track m.

The position information generating module 104 may determine that the above positions are boundary positions between segmented regions having widths equal to ½ of a track.

Figure 8:
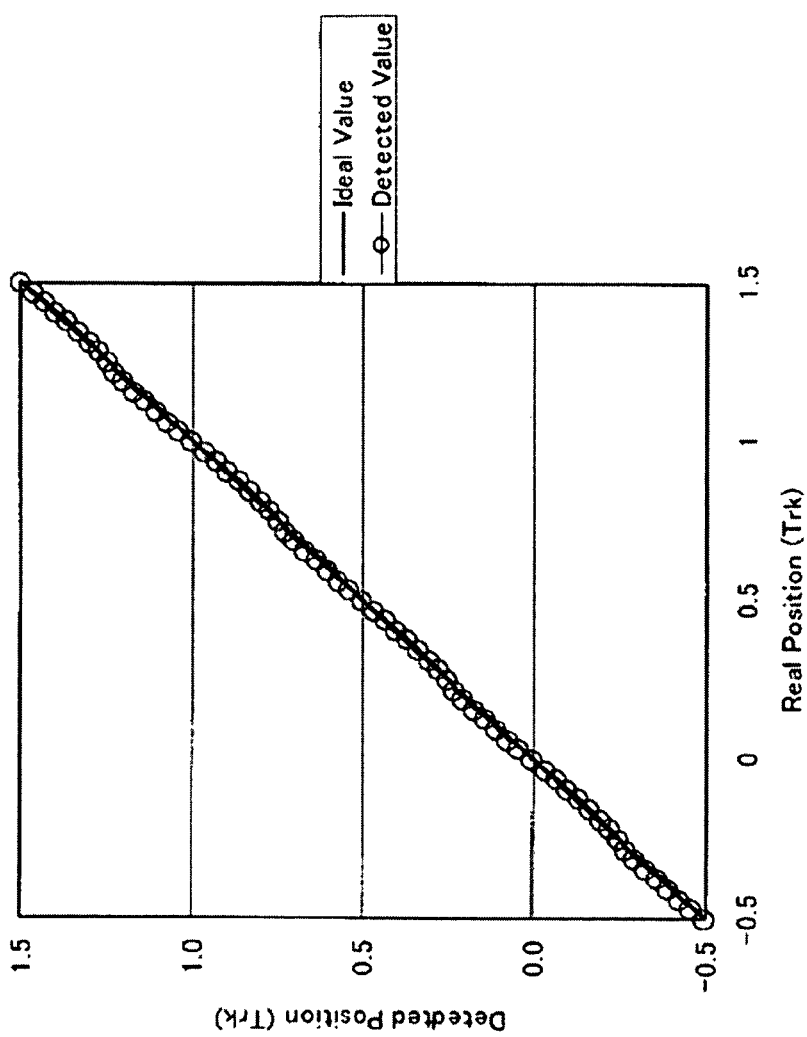
FIG. 8 is a graph of real track position as a function of detected track position.

Referring now to FIG. 8, a straight line connects the PES values selected for each segmented region according to the distance from the center of the track m. An offset value is added to each selected PES. The offset value is obtained by adding a value corresponding to the distance from the center of the corresponding segmented region to the center of the track m.

The position information generating module 104 may store the position information indicating the relationship between the track positions and the PESs in the position control module 102. The position information generating module 104 receives the PES values from the PES demodulating module 116. The position information generating module 104 references the stored position information to obtain the track positions corresponding to the received PESs. The position control data generating module 106 controls the position of the head by providing the VCM driver module 34 with the position control data. The position control data is generated based on the difference between the track position obtained by the position information generating module 104 and the position to which the head is to be moved.

The position information generating module 104 may detect the head position with the same accuracy at any track position if the relationship between the track positions and the PESs is linear as shown by the ideal values of FIG. 8. However, near specified regions in each segmented region (i.e., at track positions of −⅜, −⅛, +⅛, . . . , +¹³⁄₈, and +¹⁵⁄₈), the relationship diverges from the ideal relationship. The divergence may be due to using each curve shown in FIG. 7 at a relatively wide range of ½-track intervals. When the detected head position diverges from the ideal values, the position information generating module 104 cannot accurately determine the position of the head in regions near the divergence. The divergence from the ideal values may be decreased as follows.

The position information generating module 104 may use different PESs at ¼-track intervals to generate position information that is close to the ideal values. For example, in FIGS. 7 and 8, selected PESba is selected for the segmented region ranging from −¼ to +¼ of a track from the center of the track m. Instead, the position information generating module 104 may select PESba for the segmented region ranging from −⅛ to +⅛ of a track from the center of the track m. The position information generating module 104 may select PESbc for the adjacent segmented region having a width of ¼ of a track. The linearity of PESba is greater in the region ranging from −⅛ to +⅛ of a track from the center of the track m than in the regions from +⅛ to +¼ and −⅛ to −¼ of the track. Accordingly, the divergence from the ideal values is decreased.

The position information generating module 104 may generate the position information using combinations of the burst data A, B, C, and D different than those of FIG. 7. The position information generating module 104 may detect a ⅛ offset position (i.e., a position shifted by ⅛ of a track from a center of a track or from a boundary between adjacent tracks). Detecting the ⅛ offset position is described below.

Figure 9:
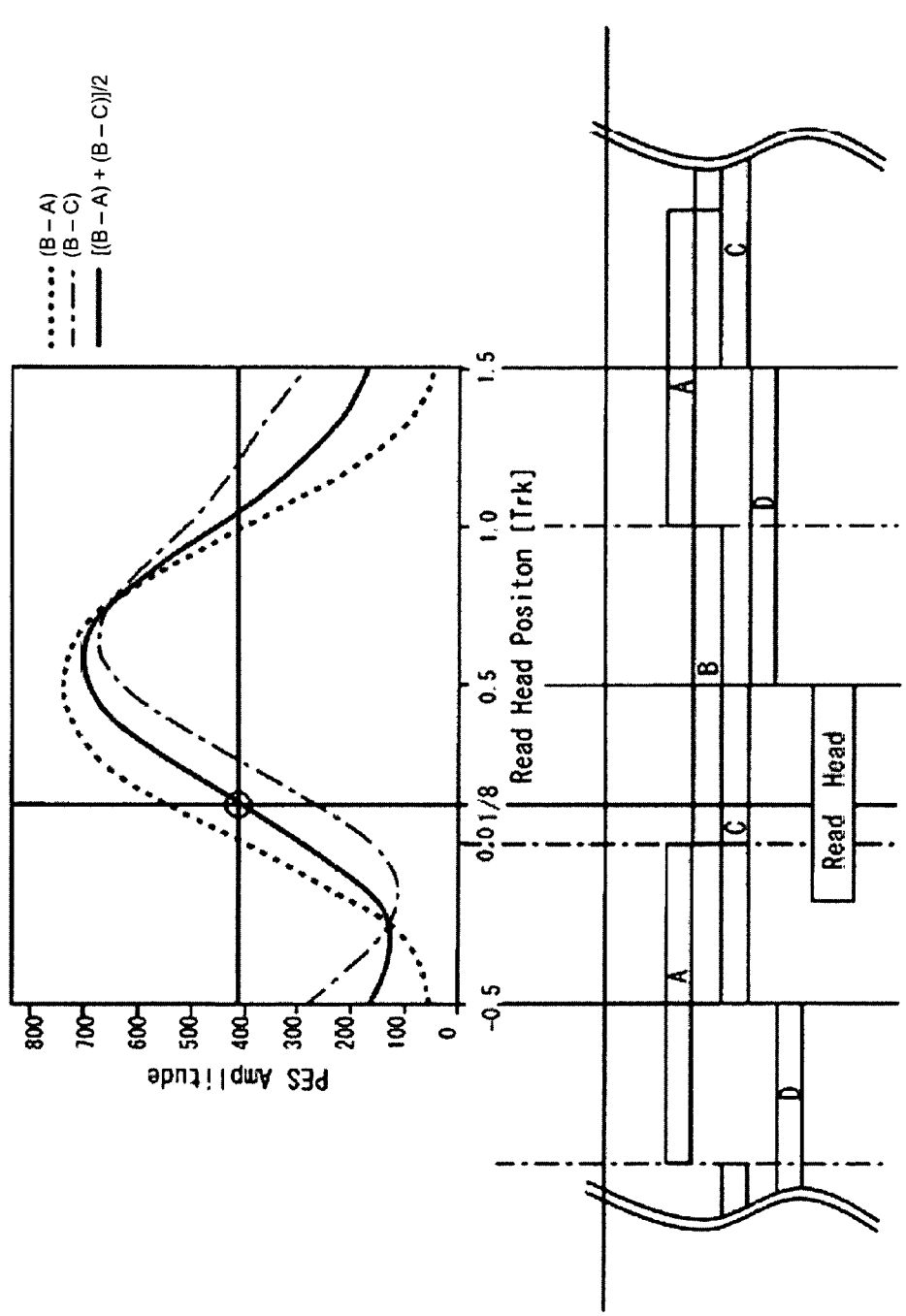
FIG. 9 is a graph of read head position as a function of PES amplitude.

Referring now to FIG. 9, a value of (B−A) indicating a difference between the burst data B and the burst data A is shown for each head position. A value of (B−C) indicating a difference between the burst data B and the burst data C is shown for each head position. A value of [(B−A)+(B−C)]/2 is shown for each head position.

When the center of the head is at the +⅛ track position, the difference between the widths of the burst data B and A covered by the head is equal to the difference between the widths of the burst data B and C covered by the head. Thus, when the center of the head is at the +⅛ track position, the value of [(B−A)+(B−C)]/2 is zero. Accordingly, the position information generating module 104 determines that the head is at the +⅛ track position when the value of [(B−A)+(B−C)]/2 is zero.

More specifically, the position information generating module 104 generates the difference between PES values output by the head for each pair of burst patterns (i.e., A and B, or C and D) that are shifted by the width of a track. The position information generating module 104 also generates the difference between PES values output by the head for each pair of burst patterns (i.e. A and C, A and D, B and C, or B and D) that are shifted by half the width of the track. When the differences between the PES values are equal, the head can be moved to an offset position shifted by ⅛ the width of a track from the boundary between adjacent tracks (or from the center of the track). Thus, the position information generating module 104 can detect not only the ⅛ track position, but any position offset by ⅛ of a track from the center of a track (or from the boundary between adjacent tracks).

For example, the position information generating module 104 can detect each of the offset positions shown below.

[(C−D)+(C−A)]/2=0: position shifted from the center of the track m by −⅜

[(B−A)+(C−A)]/2=0: position shifted from the center of the track m by −⅛

[(B−A)+(B−C)]/2=0: position shifted from the center of the track m by +⅛

[(A−B)+(B−C)]/2=0: position shifted from the center of the track m by +⅜

[(A−B)+(D−B)]/2=0: position shifted from the center of the track m by +⅝

[(D−C)+(D−B)]/2=0: position shifted from the center of the track m by +⅞

[(D−C)+(A−D)]/2=0: position shifted from the center of the track m by +⁹⁄₈

RC-DNA-DA/2=0: position shifted from the center of the track m by +¹¹⁄₈

The position control module 102 can bring the detected head positions closer to the ideal values by using different PESs for each segmented region having boundaries at the positions of the detected offset positions and having a width of ¼ of the track.

In FIG. 9, the curves of the different PESs plotted against the track positions have different slopes. Let PESmain denote the differences in PES values of burst data shifted by the width of the track (i.e., PESab, PESba, PEScd, and PESdc). Let PESsub denote the differences in PES values of burst data shifted by half the width of the track (i.e., PESca, PESad, and PESbc). The curves for PESmain as a function of the track positions have different slopes than the curves for PESsub as a function of the track positions. For example, the slope of the linear portion in each segmented region is different. PESmain and PESsub can both be corrected such that the slopes of the linear portions in each segmented region are equal.

Figure 10:
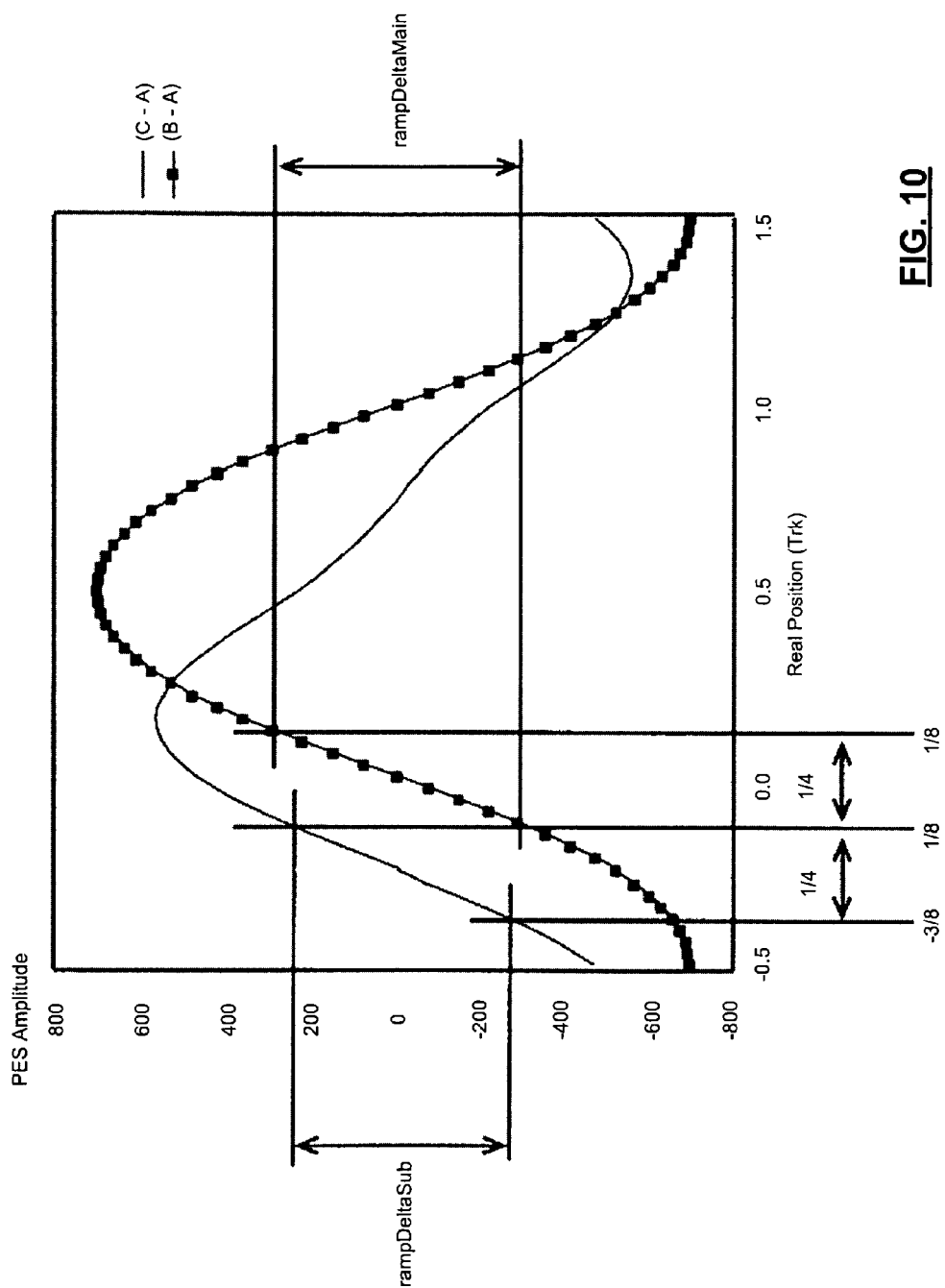
FIG. 10 is a graph of real track position as a function of PES amplitude.

Referring now to FIG. 10, a correction coefficient for correcting the relationship between the PESs and the track positions may be generated as follows. Values of PESca corresponding to a position from the center of the track m are shown as an example of PESsub. Values of PESba corresponding to a position from the center of the track m are shown as an example of PESmain.

The position information generating module 104 can generate the correction coefficient of PESmain using the values of PESmain at a position shifted by −⅛ of a track and a position shifted by +⅛ of a track from the center of the track m. The difference between the PES value at the −⅛ position and the PES value at the +⅛ position may be called "rampDeltaMain." The correction coefficient for the segmented region ranging from −⅛ to +⅛ can be expressed as follows:

posRampSlopeMain=(¼)/rampDeltaMain.

Similarly, the position information generating module 104 can generate the correction coefficient of PESsub using the values of PESsub at a position shifted by −⅜ of a track and a position shifted by −⅛ of a track from the center of the track m. The difference between the PES value at the −⅜ position and the PES value at the −⅛ position may be called "rampDeltaSub." The correction coefficient for the segmented region ranging from −⅜ to −⅛ can be expressed as follows:

posRampSlopeSub=(¼)/rampDeltaSub.

Figure 11:
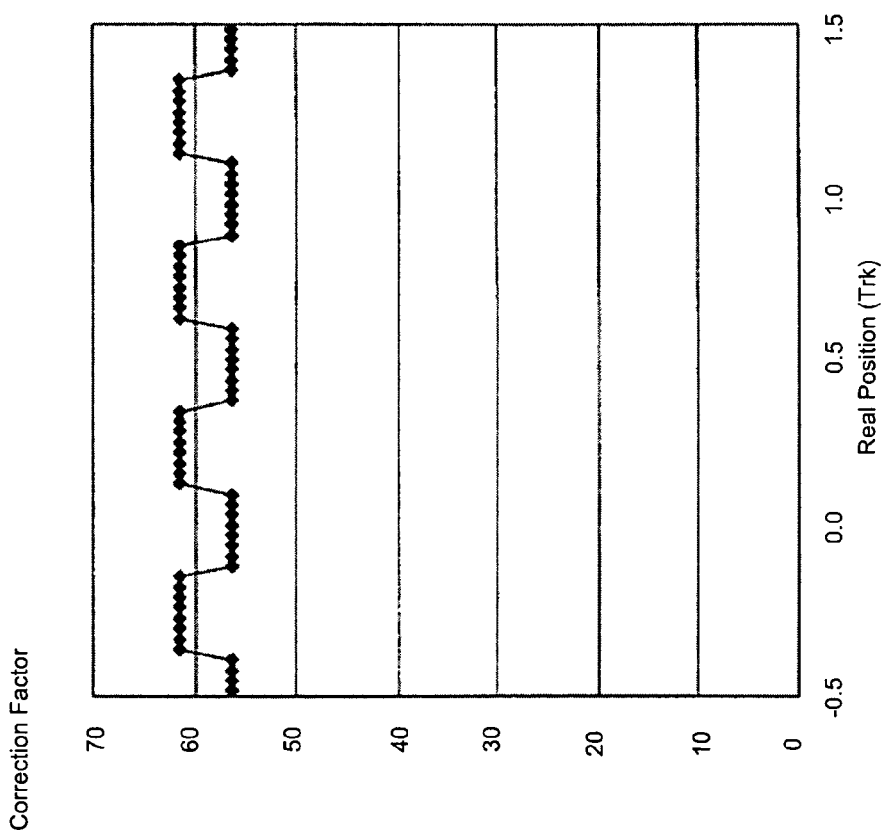
FIG. 11 is a graph of real track position as a function of correction factor.

Referring now to FIG. 11, an example of correction coefficients that are plotted against their position from the track is shown. The vertical axis represents a value obtained by multiplying the correction coefficients by $2^{17}$. The correction coefficient corresponding to PESmain is approximately 56. The correction coefficient corresponding to PESsub is approximately 61. The position information generating module 104 uses the appropriate correction coefficient for each segmented region corresponding to PESmain or PESsub.

Figure 12:
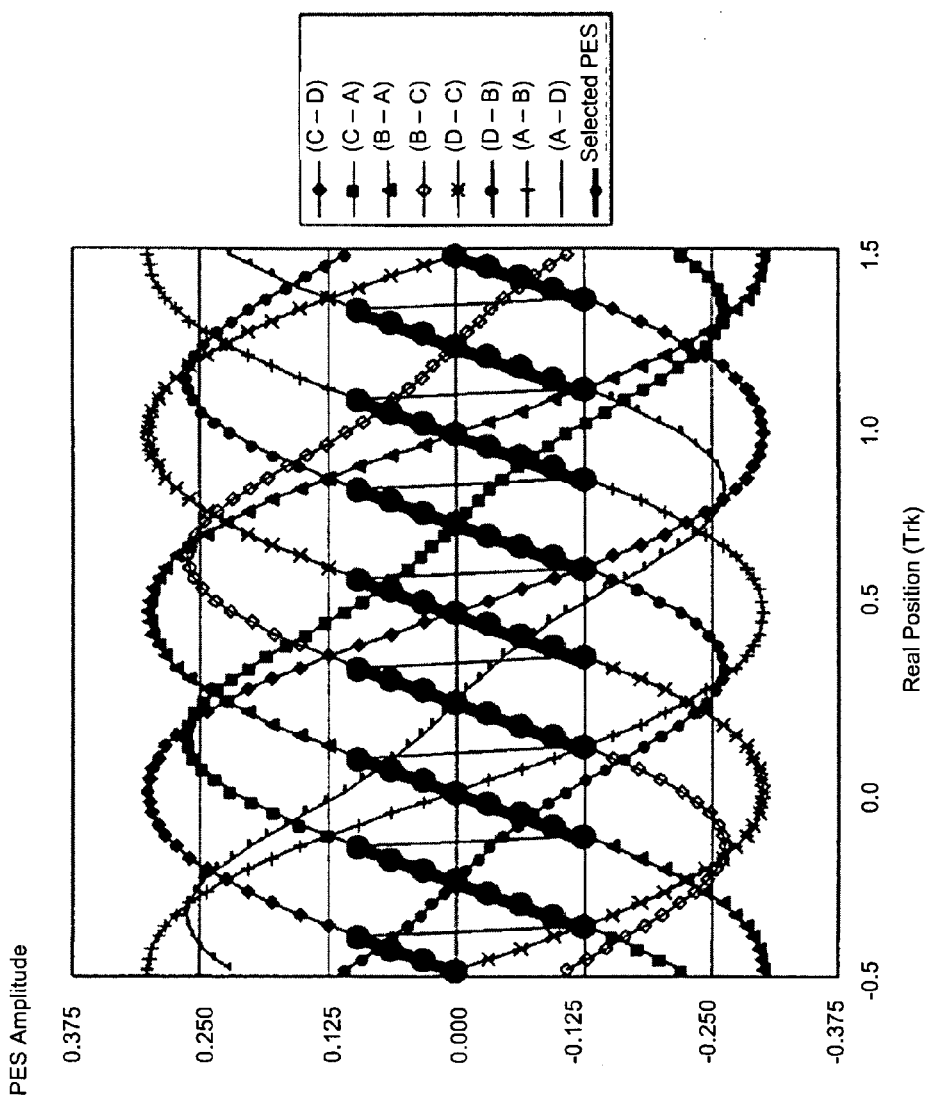
FIG. 12 is a graph of real track positions as a function of PES amplitude.

Referring now to FIG. 12, a graph of real track positions as a function of corrected PESs when different PESs are used at ¼-track intervals is shown. PEScd, PESba, PESab, and PESdc are multiplied by posRampSlopeMain. PESca, PESbc, PESdb, and PESad are multiplied by posRampSlopeSub. In other words, the gain of the PESs is adjusted by the correction coefficient. As a result, the slope of the linear component of each segmented region is practically the same.

The position information generating module 104 can generate accurate position information by selecting the PES having the highest linearity for each segmented region. For example, from FIG. 12, the position information generating module 104 may select PESs having amplitude of nearly 0. Such PESs for each segmented region are shown below.

−⅝ to −⅜: PEScd
−⅜ to −⅛: PESca
−⅛ to +⅛: PESba
+⅛ to +⅜: PESbc
+⅜ to +⅝: PESdc
+⅝ to +⅞: PESdb
⅞ to +⁹⁄₈: PESab
+⁹⁄₈ to +¹¹⁄₈: PESad
+¹¹⁄₈ to +¹³⁄₈: PEScd

One end of each segmented region is at a first offset position shifted by ⅛ width of a track from the center of the track (or from the boundary between adjacent tracks). The other end of each segmented region is at a second offset position shifted by ¼ width of a track from the first offset position.

For example, the head may be at a position in the segmented region ranging from −⅛ of a track to +⅛ of a track from the center of the track m. The head position may be determined based on the burst data A, B, C, and D and the track number received from the servo address demodulating module 114. When the head is determined to be positioned as such, the position information generating module 104 selects PESba since PESba has amplitude of nearly 0 in the above segmented range and increases thereafter.

Figure 13:
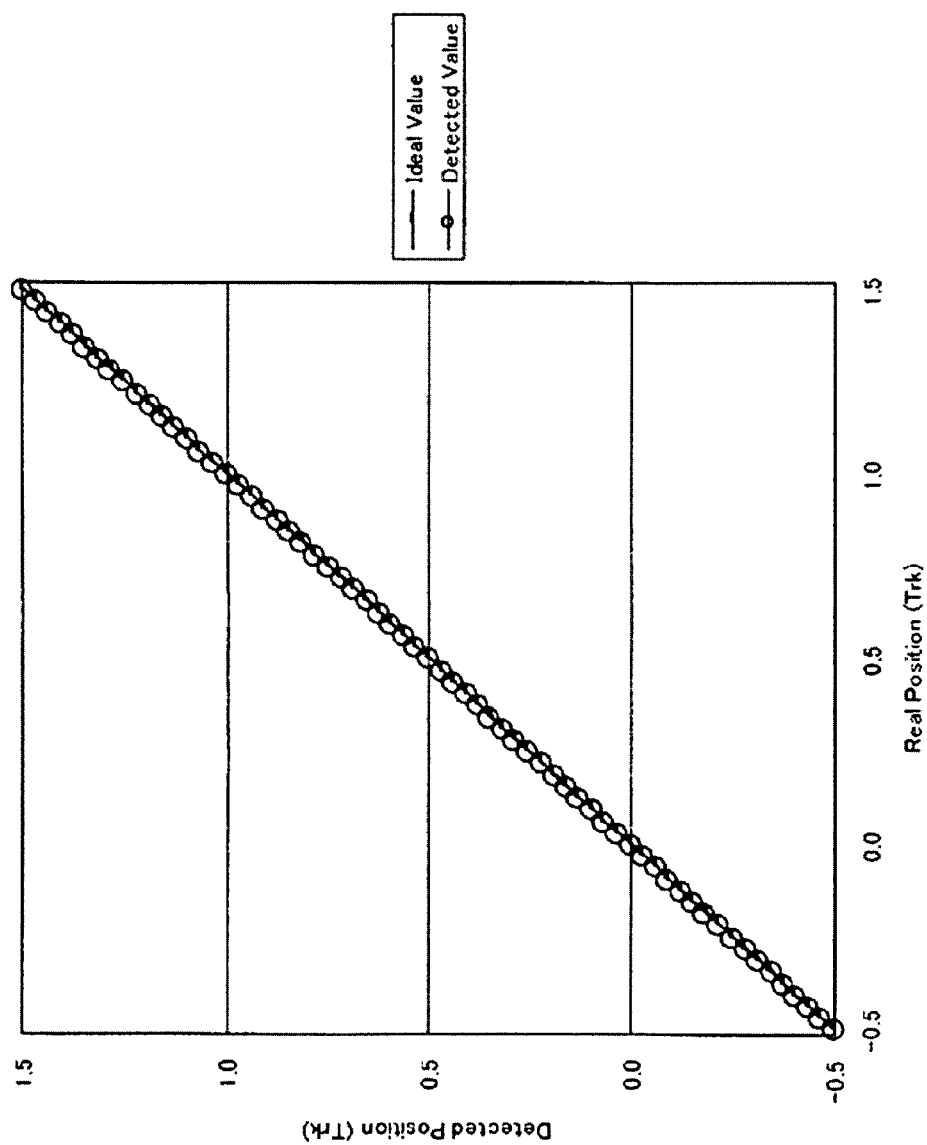
FIG. 13 is a graph of real track position as a function of detected track position.
Figure 14:
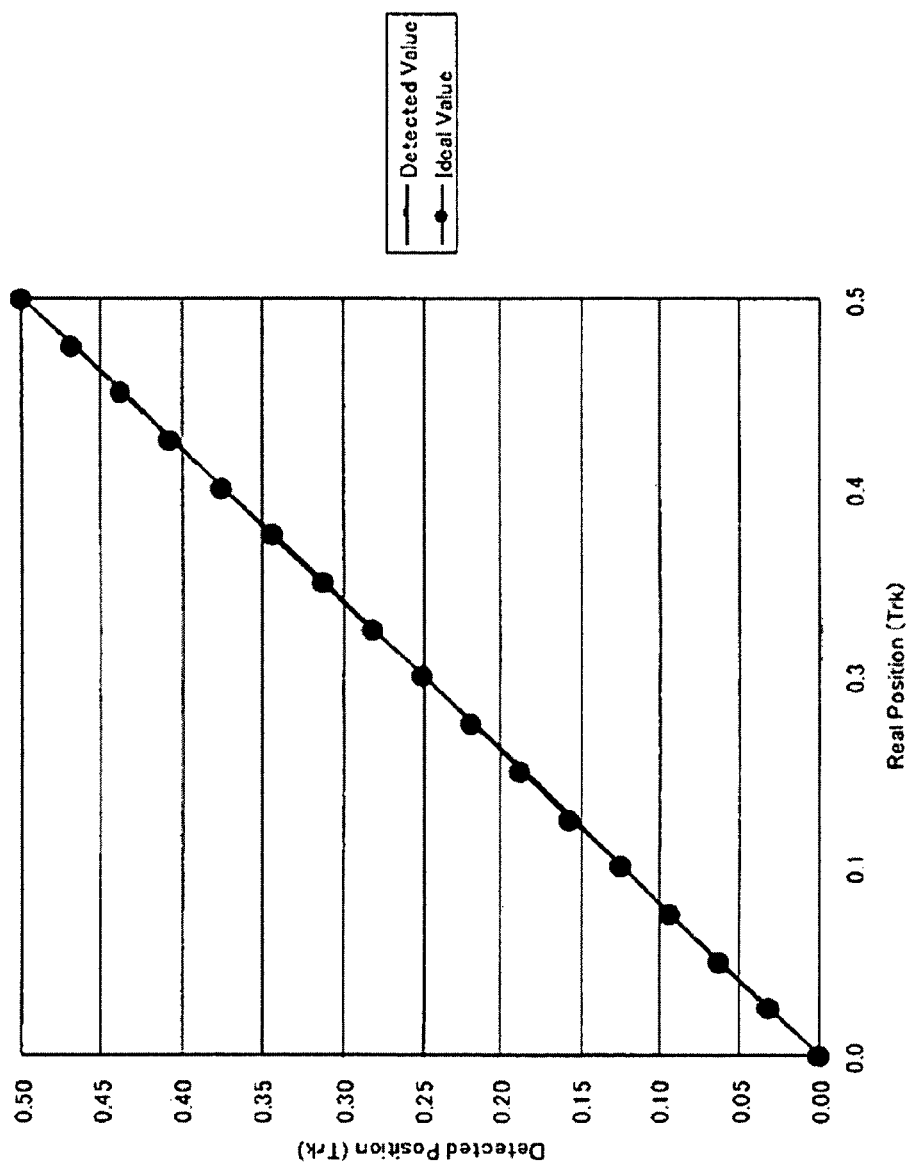
FIG. 14 is a graph of real track position as a function of detected track position.

Referring now to FIGS. 13 and 14, a straight line connects the PES values selected for each segmented region according to the distance from the center of the track m. In FIG. 13, the PES values are selected according to FIG. 12. In FIG. 14, the range from track positions 0 to 0.5 is magnified to show improved linearity relative to the line shown in FIG. 4. As shown in FIG. 13, the relationship between the detected track positions and the real track positions is practically an ideal straight line. Accordingly, the position control module 102 can accurately control the position of the head at any of the track positions.

The position information generating module 104 stores the correction coefficients posRampSlopeMain and posRampSlopeSub used to generate the position information. The position information generating module 104 generates PESmain and PESsub using the PESs generated based on the servo information read by the head. The position information generating module 104 multiplies PESmain and PESsub by the correction coefficients posRampSlopeMain and posRampSlopeSub read from the position control module 102, respectively. Thus, the position information generating module 104 can track head positions by referencing the stored position information using the multiplication results.

In FIGS. 9 to 14, a position offset by an ideal amount equal to ⅛ of a track from the center of any track (or from the boundary between any two adjacent tracks) can be detected by using a combination of PESmain and PESsub. Practically, characteristics of the head or the burst patterns may slightly differ. Accordingly, a small difference 6 may result between (i) the offset position generated based on the combination of PESmain and PESsub and (ii) the real position at ⅛ of a track from the center of a track (or from the boundary between adjacent tracks).

Figure 15:
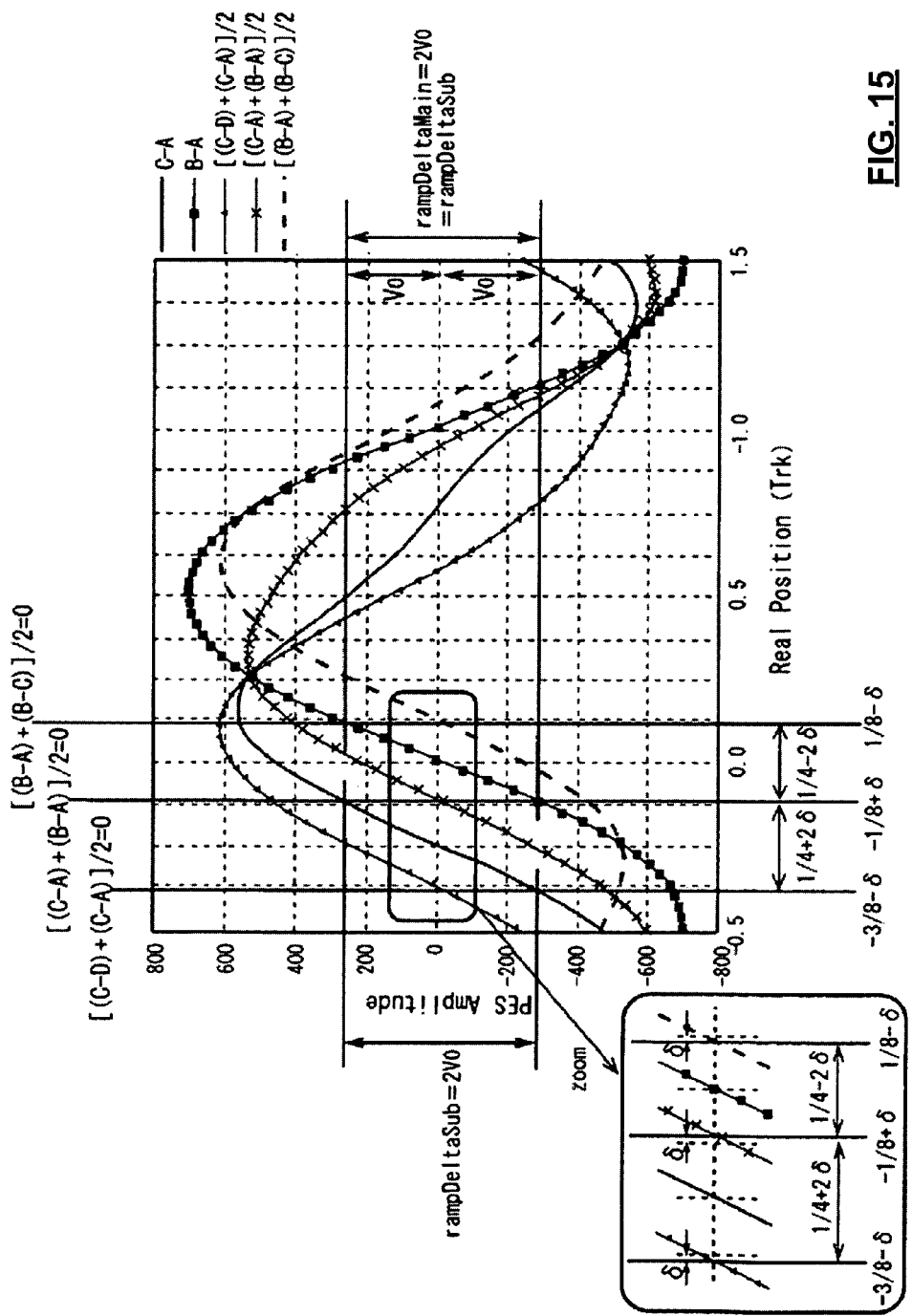
FIG. 15 is a graph of real track position as a function of PES amplitude.

Referring now to FIG. 15, a relationship between the PESs and the track positions when this small difference 6 occurs is shown. In the magnified portion of FIG. 15, the dotted vertical lines represent track positions shifted from the center of a track by −⅜, −²⁄₈, −⅛, 0, and +⅛ of a track. The track positions at which [(C−D)+(C−A)]/2, [(C−A)+(B−A)]/2, and [(B−A)+(B−C)]/2 are equal to 0 are ((−⅜)−δ), ((−⅛)+δ), and ((+⅛)+δ), respectively.

The position information generating module 104 may generate the correction coefficients of PESmain and PESsub by assuming δ=0. For example, RampDeltaMain and RampDeltaSub may be equal when generated using the amplitude of the PES when [(C−D)+(C−A)]/2, [(C−A)+(B−A)]/2, and [(B−A)+(B−C)]/2 are equal to 0. As a result, the correction coefficients of PESmain and PESsub are the same when generated as follows:

posRampSlopeMain=(¼)/RampDeltaMain posRampSlopeSub=(¼)/RampDeltaSub

Figure 16:
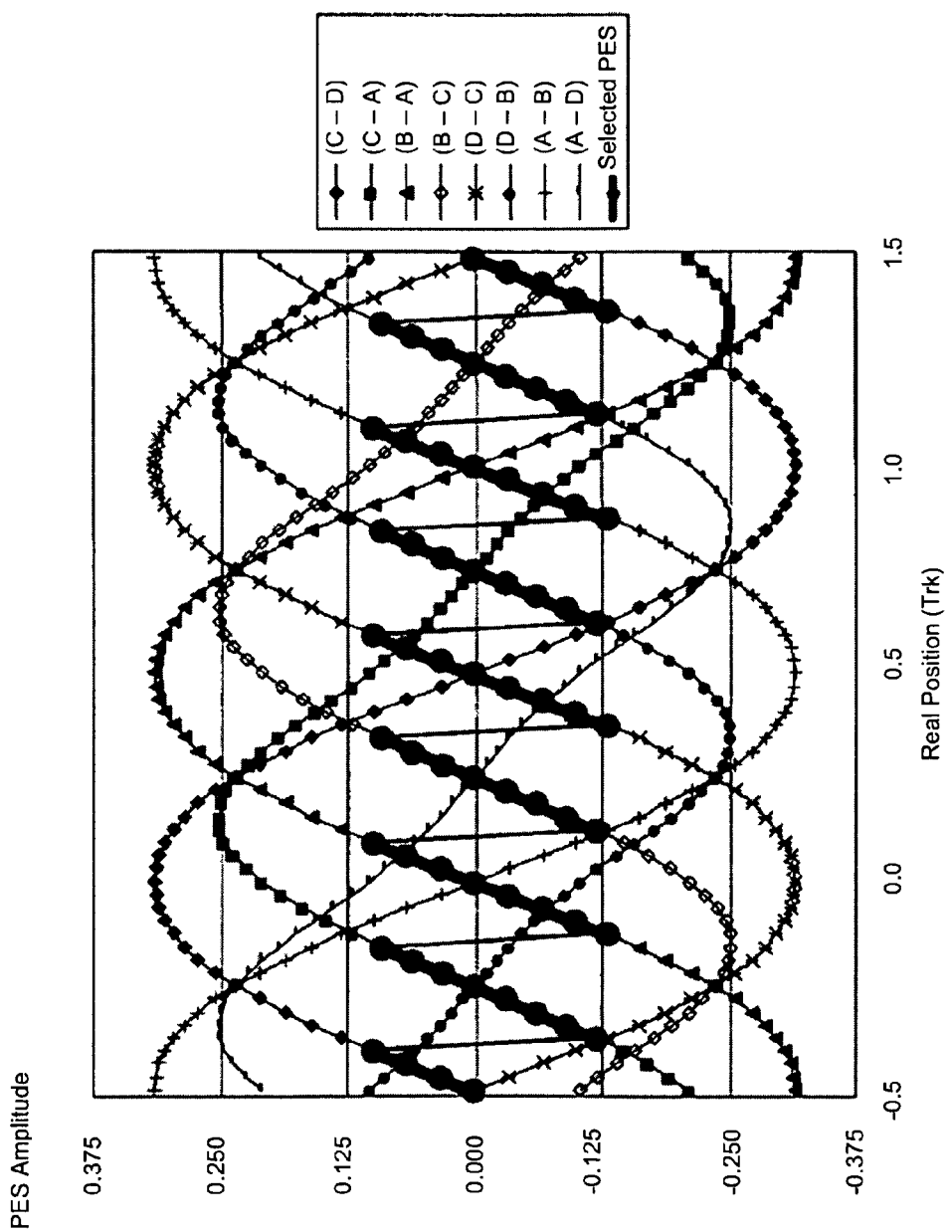
FIG. 16 is a graph of real track position as a function of PES amplitude.
Figure 17:
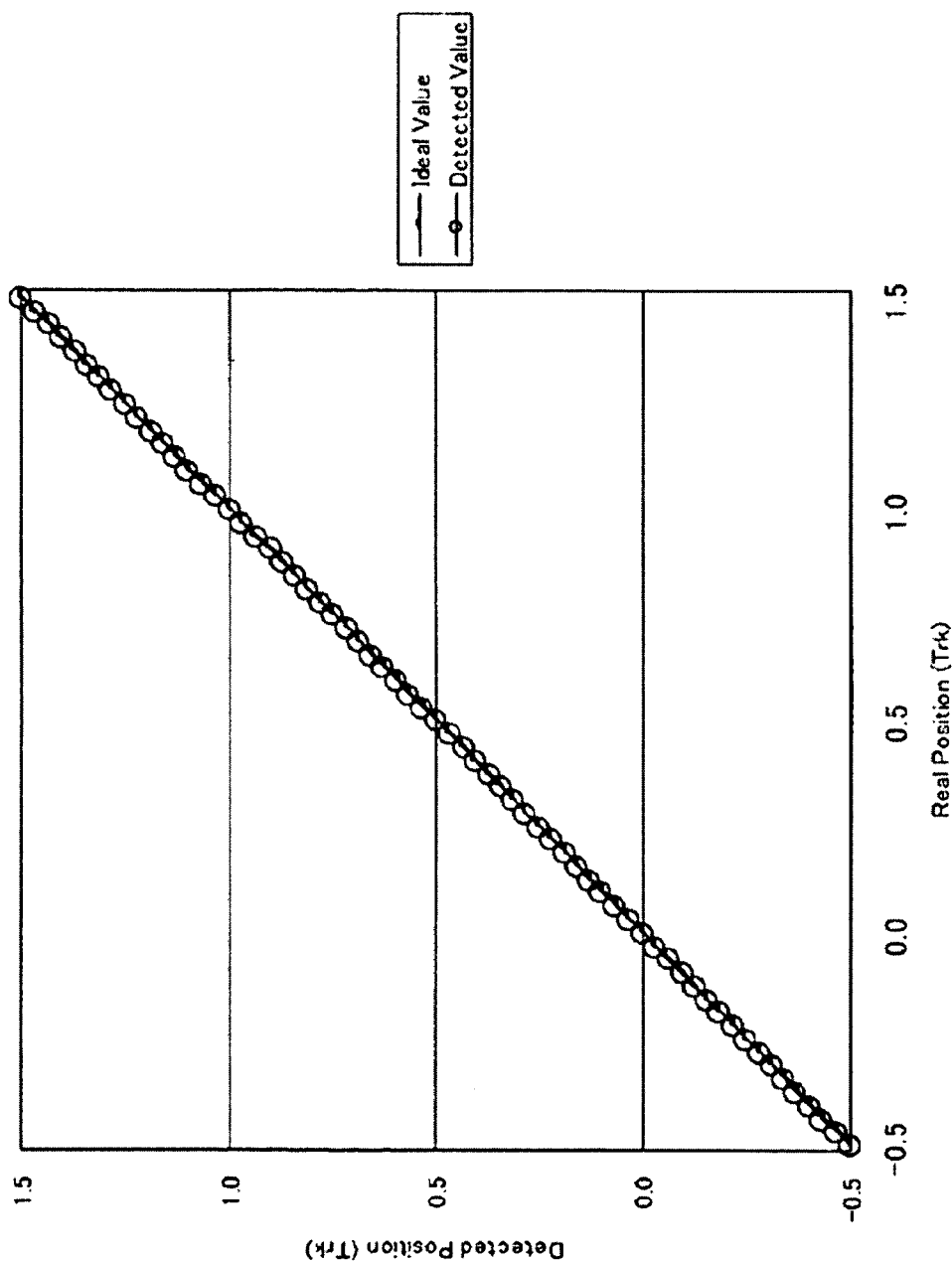
FIG. 17 is a graph of real track position as a function of detected track position.
Figure 18:
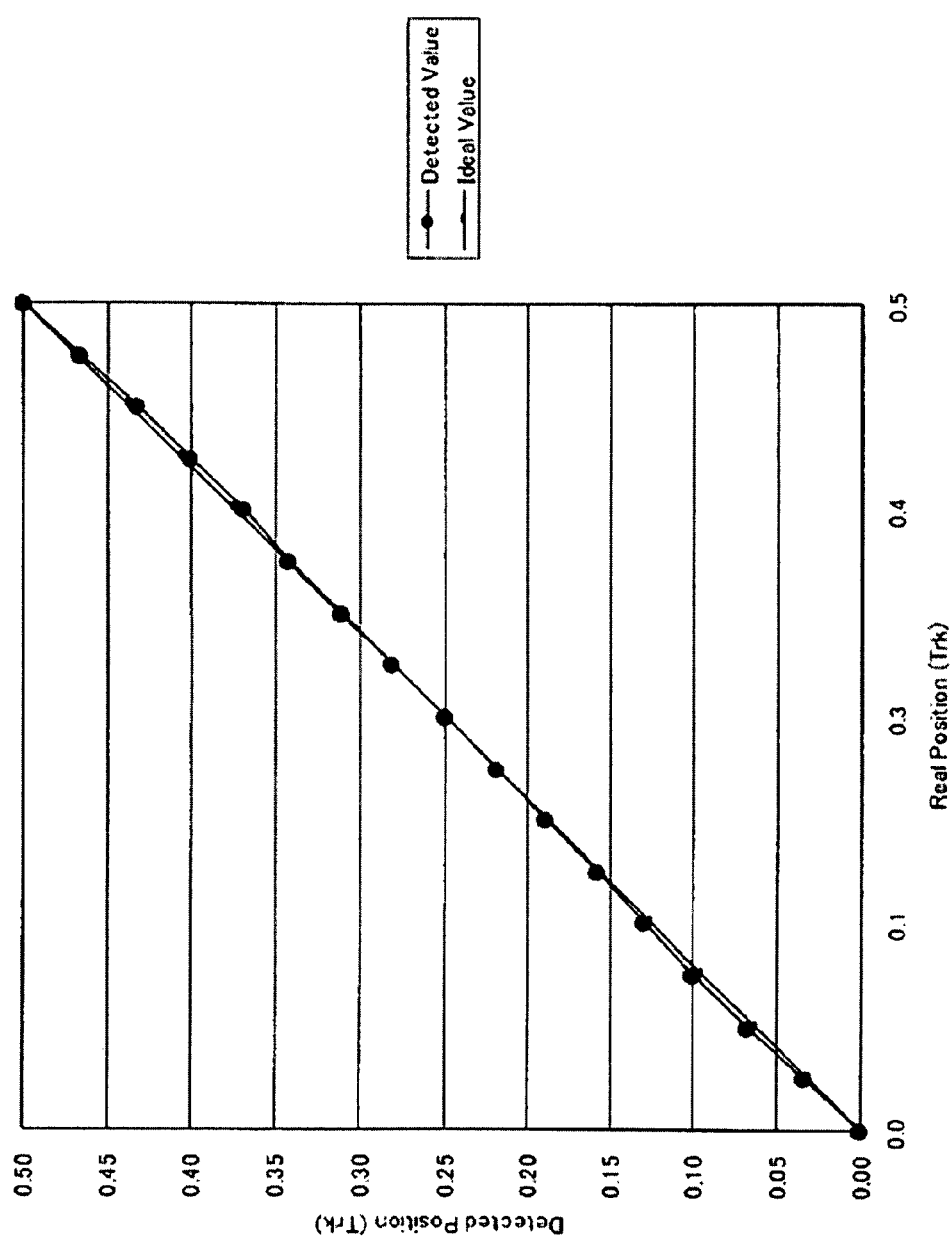
FIG. 18 is a graph of real track position as a function of detected track position.

Referring now to FIGS. 16-18, PESs in each segmented region corrected using correction coefficients generated when δ≠0 are shown. A relationship between measured PESs and track positions shown in FIGS. 17 and 18 exhibits linearity closer to ideal than the relationship shown in FIGS. 8 and 4. The position information generating module 104 can generate and store the correction coefficients for each sector and track during manufacturing.

Figure 19:
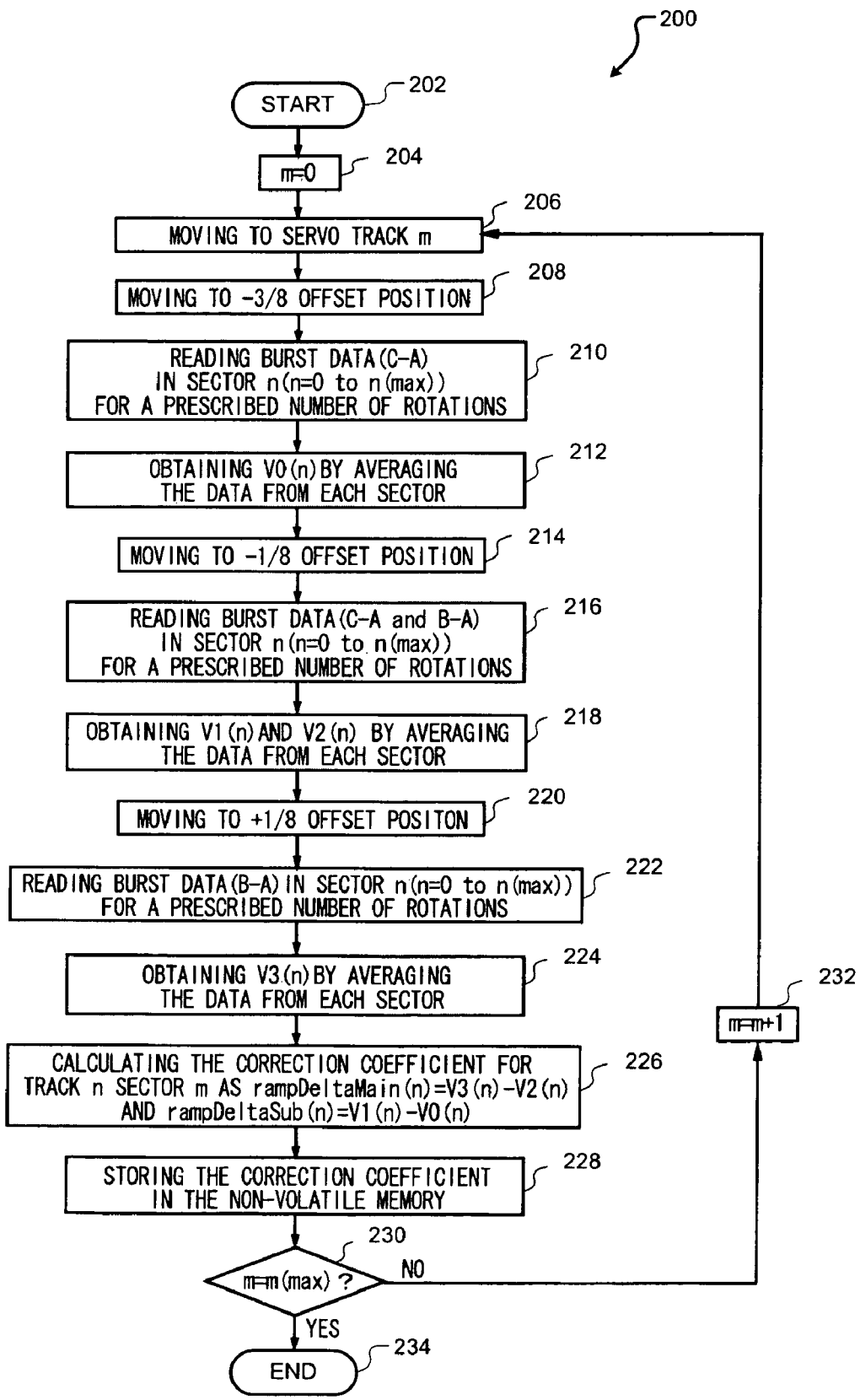
FIG. 19 is a flowchart of a method for generating a correction coefficient table.

Referring now to FIG. 19, a method 200 for generating a correction coefficient table for a sector n begins in step 202. The position control module 102 initializes the track number to m=0 in step 204. The position control module 102 moves the head to track m in step 206. The position control module 102 moves the head to the −⅜ offset position in step 208. The read-channel module 28 uses the head to read the burst data (C−A) for a predetermined number of rotations at the −⅜ offset position in step 210.

In step 212, the PES demodulating module 116 demodulates the burst data to generate each PES and outputs the generated PESs to position information generating module 104. The position information generating module 104 generates V0(n) by averaging the PESs for the predetermined number of rotations.

The position control module 102 moves the head to the −⅛ offset position in step 214. The read-channel module 28 reads the burst data (C−A) and (B−A) for the predetermined number of rotations at the −⅛ offset position in step 216. The position information generating module 104 generates V1(n) and V2(n) by averaging the PESs for the predetermined number of rotations in step 218.

The position control module 102 moves the head to the +⅛ offset position in step 220. The read-channel module 28 reads the burst data (B-A) for the predetermined number of rotations at the +⅛ offset positioning in step 222. The position information generating module 104 generates V3(n) by averaging the PESs for the predetermined number of rotations in step 224.

The position control module 102 generates rampDeltaMain(n)=[V3(n)−V2(n)] and rampDeltaMain(n)=[V1(n)−V0(n)] and generates the correction coefficients for the track m and the sector n in step 226. The position information generating module 104 stores the correction coefficients with the sector numbers and the track positions in step 228.

The position control module 102 determines in step 230 if the track number is equal to a maximum track number. If the result of step 230 is false, the position control module 102 increments the track number (i.e., m=(m+1)) in step 232, and steps 204 through 230 are repeated. If the result of step 20 is true, generation of the position information table for all the sectors and tracks is complete, and the method 200 ends in step 234.

Figure 20:
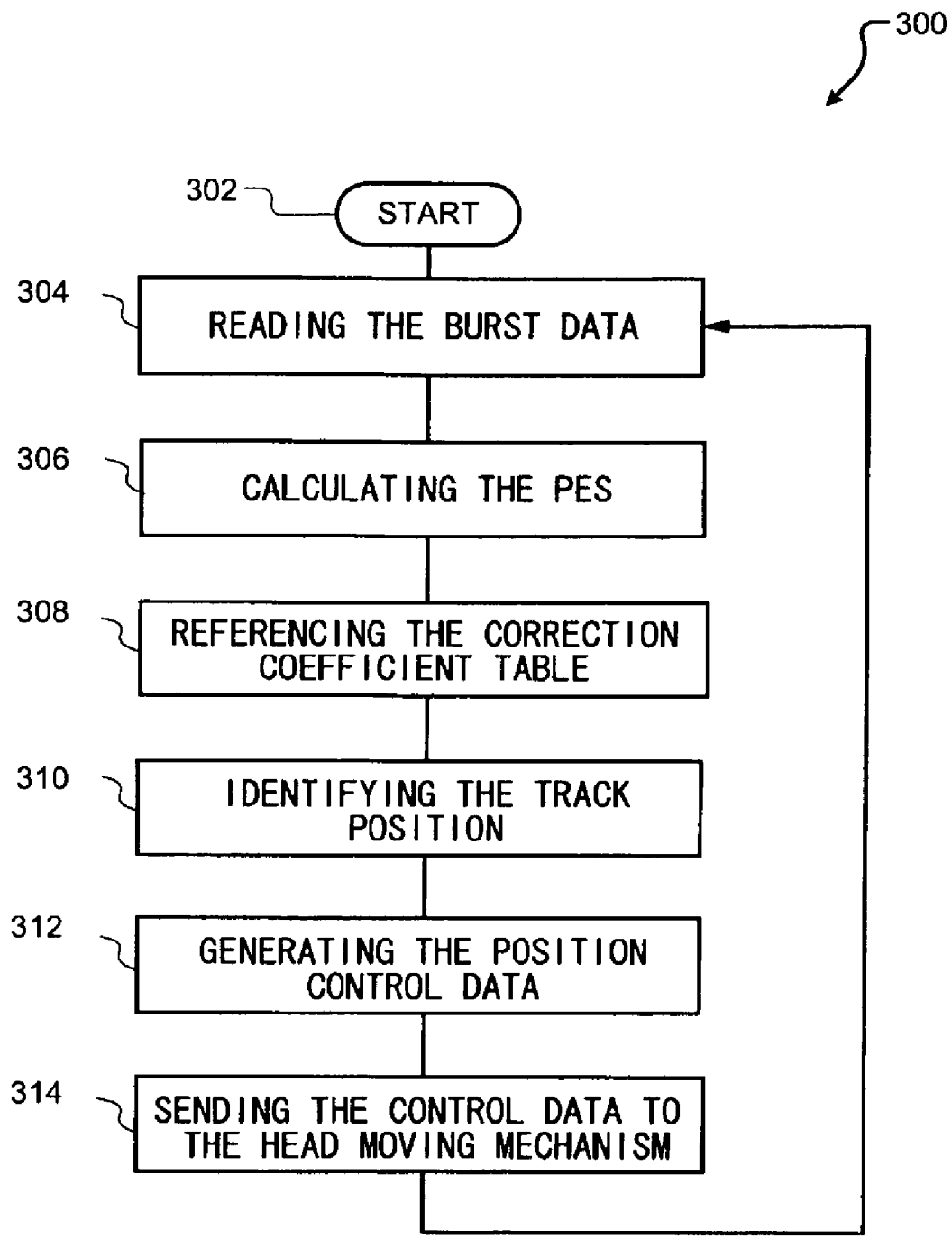
FIG. 20 is a flowchart of a method for controlling position of a head of the HDD.

Referring now to FIG. 20, a method 300 for controlling the head position during read/write operations is shown. The method 300 comprises a feedback loop that begins in step 302. The read-channel module 28 outputs the burst data read by the head to the PES demodulating module 116 at the timing of each servo mark detected by the timing generating module 112 in step 304. The PES demodulating module 116 demodulates the burst data to generate each PES and outputs the generated PESs to the position information generating module 104 in step 306. In step 308, the position information generating module 104 generates position information by referencing the stored correction coefficient table.

The position information generating module 104 identifies the track positions corresponding to the input PESs in step 310. In step 312, the position control data generating module 106 generates position control data based on the difference between the real track position and the track position to be accessed. The position control data generating module 106 sends the position control data to the VCM driver module 34 in step 314. The feedback loop is completed by returning control to step 302 and repeating steps 302 through 314.

In some implementations, to reduce the size of memory used to store the position information, the position information generating module 104 may generate the relationship between the PESs and the track positions using an average value of all sectors in a representative portion of a track. For example, the representative portion may include an inner border, an outer border, and/or a center portion of the track.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
a signal generating module configured to generate position error signals based on servo bursts read from a servo region of a track of a disk drive, wherein the servo burst are read by a head of the disk drive, and wherein the servo bursts include a first servo burst, a second servo burst, a third servo burst, and a fourth servo burst; and
a position control module configured to
generate differences between the position error signals, and
determine a position of the head relative to the track based on (i) a first difference of the differences and (ii) a second difference of the differences,
wherein the first difference is based on the first servo burst and the second servo burst, wherein the second difference
is based on (i) the third servo burst and (ii) the first servo burst or the second servo burst, and
is independent of the fourth servo burst, and
wherein the third servo burst is offset by a predetermined distance from the first servo burst or the second servo burst.

2. The system of claim 1, wherein the predetermined distance includes one-half of a width of the track.

3. The system of claim 1, wherein each of the first servo burst, the second servo burst, the third servo burst, and the fourth servo burst:
is parallel to a radius of the track,
has a length equal to a width of the track, and
is not located on a same radial line.

4. The system of claim 1, wherein the position control module is configured to determine changes in the position of the head in increments of one-half of the predetermined distance.

5. The system of claim 1, wherein the position control module is configured to determine that the head is at N multiples of one-fourth of the predetermined distance from a center of the track when the first difference matches the second difference, where N is an odd integer.

6. The system of claim 1, wherein the position control module is configured to generate a position control signal that moves the head by one-fourth of the predetermined distance when the first difference matches the second difference.

7. The system of claim 1, wherein the position control module is configured to:
multiply the first difference by a first multiplier, and
multiply the second difference by a second multiplier,
wherein the first multiplier is based on
a first value of the first difference at a first distance from a center of the track, and
a second value of the first difference at a second distance from the center of the track, and
wherein the second multiplier is based on
a third value of the second difference at a third distance from the center of the track, and
a fourth value of the second difference at a fourth distance from the center of the track.

8. The system of claim 7, wherein a difference between the first distance and the second distance is equal to a difference between the third distance and the fourth distance.

9. The system of claim 8, wherein each of (i) the difference between the first distance and the second distance and (ii) the difference between the third distance and the fourth distance is equal to one-half of the predetermined distance.

10. A disk controller comprising the system of claim 1, wherein the disk controller controls read/write operations performed by the head in the disk drive.

11. A method comprising:
generating position error signals based on servo bursts read from a servo region of a track of a disk drive, wherein the servo bursts are read by a head of the disk drive, and wherein the servo bursts include a first servo burst, a second servo burst, a third servo burst, and a fourth servo burst;
generating differences between the position error signals;
generating a first difference of the differences based on the first servo burst and the second servo burst;
generating a second difference of the differences based on (i) the third servo burst and (ii) the first servo burst or the second servo burst,
wherein the second difference is generated independently of the fourth servo burst, and
wherein the third servo burst is offset by a predetermined distance from the first servo burst or the second servo burst; and
determining a position of the head relative to the track based on the first difference and the second difference.

12. The method of claim 11, further comprising offsetting the third servo burst by one-half of a width of the track from the first servo burst or the second servo burst.

13. The method of claim 11, further comprising:
reading each of the first servo burst, the second servo burst, the third servo burst, and the fourth servo burst,
wherein each of the first servo burst, the second servo burst, the third servo burst, and the fourth servo burst:
has a length equal to a width of the track,
is parallel to a radius of the track, and
is not located on a same radial line.

14. The method of claim 11, further comprising determining changes in the position of the head in increments of one-half of the predetermined distance.

15. The method of claim 11, further comprising determining that the head is at N multiples of one-fourth of the predetermined distance from a center of the track when the first difference matches the second difference, where N is an odd integer.

16. The method of claim 11, further comprising generating a position control signal that moves the head by one-fourth of the predetermined distance when the first difference matches the second difference.

17. The method of claim 11 further comprising:
generating a first multiplier based on
a first value of the first difference at a first distance from a center of the track, and
a second value of the first difference at a second distance from the center of the track;
generating a second multiplier based on
a third value of the second difference at a third distance from the center of the track, and
a fourth value of the second difference at a fourth distance from the center of the track;
multiplying the first difference by the first multiplier; and
multiplying the second difference by the second multiplier.

18. The method of claim 17, further comprising:
selecting the first distance and the second distance,
wherein a difference between the first distance and the second distance is equal to a difference between the third distance and the fourth distance.

19. The method of claim 18, further comprising:
selecting the difference between the first distance and the second distance equal to one-half of the predetermined distance, and
selecting the difference between the third distance and the fourth distance equal to one-half of the predetermined distance.

20. The method of claim 11, further comprising determining the position of the head during read/write operations performed by the head in the disk drive.

* * * * *